United States Patent
Ito et al.

(10) Patent No.: US 7,638,947 B2
(45) Date of Patent: Dec. 29, 2009

(54) LIGHTING CONTROL CIRCUIT FOR VEHICLE LIGHTING FIXTURE

(75) Inventors: Masayasu Ito, Shizuoka (JP); Fuminori Shiotsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 899 days.

(21) Appl. No.: 11/341,725

(22) Filed: Jan. 27, 2006

(65) Prior Publication Data
US 2006/0170287 A1 Aug. 3, 2006

(30) Foreign Application Priority Data
Jan. 31, 2005 (JP) .............................. 2005-022581

(51) Int. Cl.
*H05B 37/02* (2006.01)
(52) U.S. Cl. ...................... 315/77; 315/185 R; 315/219; 315/307
(58) Field of Classification Search ................. 315/291, 315/219, 185 R, 224, 186, 193, 307, 308, 315/77, 82
See application file for complete search history.

(56) References Cited
U.S. PATENT DOCUMENTS
7,042,165 B2* 5/2006 Madhani et al. ......... 315/185 R
7,129,652 B2* 10/2006 Patel et al. .................. 315/291

FOREIGN PATENT DOCUMENTS
JP 2004-134147 4/2004

OTHER PUBLICATIONS
Patent Abstracts of Japan, Publication No. 2004-134147, Publication Date: Apr. 30, 2004, 1 page.
* cited by examiner

*Primary Examiner*—David Hung Vu
(74) *Attorney, Agent, or Firm*—Osha • Liang LLP (57) ABSTRACT

Relative comparison is made between a voltage applied to the whole of the first through eighth LEDs and a voltage applied to the first LED by a comparator. When the voltage applied to the whole of the LEDs has relatively dropped with respect to the voltage applied to part of the LEDs, the comparator outputs a Low Level signal, assumes an abnormality that accompanies a short-circuit fault in any one of the LEDs and causes a ninth LED to illuminate. Meanwhile, relative comparison is made between a voltage applied to the whole of the first through eighth LEDs and a voltage applied to the first LED by another comparator. When the voltage applied to the whole of the LEDs has relatively dropped with respect to the voltage applied to part of the LEDs, the comparator outputs a Low Level signal, assumes an abnormality that accompanies a short-circuit fault in the first LED and causes a ninth LED to illuminate.

9 Claims, 5 Drawing Sheets

LIGHTING CONTROL CIRCUIT FOR VEHICLE LIGHTING FIXTURE

CROSS-REFERENCE TO RELATED APPLICATIONS

This application is based upon and claims the benefit of priority from the prior Japanese Patent Applications No. 2005-022581, filed on Jan. 31, 2005, the entire contents of which are incorporated herein by reference.

BACKGROUND OF THE INVENTION

1. Field of the Invention

The present invention relates to a lighting control circuit for a vehicle lighting fixture and in particular to a lighting control circuit designed to control lighting of a semiconductor light source including a semiconductor light-emitting device.

2. Description of the Related Art

In the related art, a vehicle lighting fixture is known that uses a semiconductor light-emitting device such as an LED (Light Emitting Diode). This type of vehicle lighting fixture mounts a lighting control circuit for controlling lighting of an LED.

A lighting control circuit has been proposed that is, in a configuration where a plurality of LEDs are serially connected to each other to form a light source unit and a plurality of light source units are connected to each other in parallel, connected to each of both ends of the plurality of light source units connected in parallel (refer to JP-A-2004-134147, pages 3-6, FIG. 1). In this configuration, the lighting control circuit feeds the same current to all LEDs of each light source unit. A resistor is inserted serially to each light source unit. When a voltage across the resistor has dropped, for example the current is not supplied to the resistor upon a wire break in any LED of the light source unit and the voltage across the resistor drops to 0V, a wire break in any LED is assumed, and the output voltage of a switching regulator including the lighting control circuit is lowered. According to this lighting control circuit, when wire break in any LED of each light source unit occurs, the output voltage of the switching regulator is lowered, which prevents the output voltage of the switching regulator from reaching overvoltage.

JP-A-2004-134147 (pages 3-6 and FIG. 1) is referred to as a related art.

There are severals cases of wire breaks in an LED. When a wire (lead wire) connected to an LED is broken, it is possible to detect the wire break in the LED by detecting that a current does not flow in the LED. When a wire break occurs inside the LED, an attempt to detect the wire break could fail. For example, in case a semiconductor chip serving as a light-emitting device and a Zenor diode connected in parallel with the semiconductor chip are housed in an LED package, a current may keep flowing through the Zenor diode irrespective of a wire break in the semiconductor chip or wire bonding. Thus, the wire break may not be detected.

More specifically, on a wire break in the semiconductor chip in an LED package, a current does not flow through the semiconductor chip. This reduces the load on the power supply circuit and increases a voltage across the LED package. When the voltage rises and exceeds the forward voltage of the Zenor diode thus reaching the Zenor voltage of the Zenor diode, a current starts to flow through the Zenor diode and the voltage across the LED package changes from the forward voltage of the LED to a Zenor voltage. When N LED packages are serially connected, the voltage across the entire package changes from forward voltage×N to (forward voltage× (N−1)+Zenor voltage). When a current flows through the Zenor diode, the power supply circuit executes control to feed the same current to the LEDs. This applies a high voltage across the LED package where a wire break in the semiconductor chip has taken place. The voltages rises so that power consumption in the Zenor diode increases, which could result in thermal breakdown of the Zenor diode, thus lowering the Zenor voltage below the forward voltage of the LED in a thermally stable fashion.

In the case where a wire break has occurred in an LED package using a Zenor diode as an electrostatic protection rather than protection against a wire break, a current continues to flow via the Zenor diode. Thus, it may not be possible to reliably detect a wire break in an LED only by monitoring a voltage drop in a resistor serially connected to a light source unit.

When an LED without a Zenor diode for electrostatic protection or an LED using a capacitor instead of a Zenor diode as a semiconductor light source, it is necessary to consider a "short" and a "short having a certain impedance" as fault modes of LED. For example, even when one of the LEDs serially connected shorts, a current flows in each LED. Thus, it is necessary to monitor the voltage applied to a plurality of LEDs from a switching regulator to detect an error that accompanies a short-circuit fault in an LED. For example, it is possible to use a configuration where the output voltage of the switching regulator is compared with a set voltage, and when the output voltage of the switching regulator has dropped below the set voltage, a short-circuit fault in any LED is detected. Considering variations in the LED voltage, the configuration where the output voltage of the switching regulator is compared with the set voltage may fail to detect a short-circuit fault in any one of serially connected LEDs.

For example, assuming a voltage drop per LED, that is, a case where eight LEDs each having a forward voltage Vf=8V are connected in series, the output voltage of the switching regulator is 64V. While Vf=8V of the LED is assumed, the voltage is subjected to variations. Causes of such variations include "the VI characteristic of an LED", "the temperature characteristic of an LED" and "individual differences of LEDs".

The VI characteristic is such that Vf becomes larger as the current flowing in an LED (If) becomes larger. The temperature characteristic is such that Vf becomes smaller as the temperature of an LED becomes higher. Considering variations in Vf as Vf=7V to 9V, the output power range permitted as an output voltage of the regulator is 56V to 72V. In this practice, in a case where one LED goes faulty due to a short-circuit for some reason, assuming that Vf of 8V of the faulty LED becomes 0V, a switching regulator whose normal output voltage is 72V provides an output voltage of 64V irrespective of the short-circuit fault. The output voltage is within the output voltage range permitted for a switching regulator, so that only monitoring the output voltage of a switching regulator cannot detect a short-circuit fault. In other words, considering variations in the LED voltage, simply monitoring the absolute value of the output voltage of a switching regulator may not detect a short-circuit fault on one of the LEDS.

When one of the LEDs goes faulty due to a short-circuit, for example, when one LED does not illuminate due to a short-circuit fault, the lighting fixture is emitting light although the desired light distribution is not satisfied. The driver does not notice a fault and he/she may continue driving.

When a short-circuit fault detection circuit is provided for each LED, it is possible to detect a short-circuit fault in an LED without considering variations in the LED voltage. In this approach, however, the number of short-circuit fault detection circuits increases and wiring becomes thicker as the number of LEDs becomes greater, which complicates the circuit configuration.

SUMMARY OF THE INVENTION

One or more embodiments of the invention detect a fault in any one of the plurality of semiconductor light sources connected in series with each other based on variations in the voltage.

In accordance with one or more embodiments, a first aspect of the invention provides a lighting control circuit for a vehicle lighting fixture having: an energy supply control section which receives power from a power supply, and supplies light emission energy to a plurality of semiconductor light sources connected in series with each other as well as controls a current and a voltage for the plurality of semiconductor light sources; and a fault detection section which makes relative comparison between a voltage applied to all of the semiconductor light sources and a voltage applied to a part of the semiconductor light sources to detect a fault in any one of the semiconductor light sources.

(Operation) In a process where light emission energy is supplied to the plurality of semiconductor light sources connected in series with each other, relative comparison is made between the voltage applied to all of the semiconductor light sources and the voltage applied to the part of the semiconductor light sources. For example, when the ratio of the two voltages changes, it is possible to detect a fault in any semiconductor light source other than at least part of the semiconductor light sources (semiconductor light sources to be compared) among the plurality of semiconductor light sources. That is, it is possible to detect a fault in any semiconductor light source other than at least part of the semiconductor light sources without detecting voltages applied to each semiconductor without individually detecting a voltage applied to each semiconductor light source. This makes it possible to simplify the circuit configuration.

In accordance with one or more embodiments, a second aspect of the invention provides the lighting control circuit for the vehicle lighting fixture according to the first aspect, characterized in that the fault detection section detects a fault in any semiconductor light source other than the part of the semiconductor light sources when the voltage applied to all of the semiconductor light sources changes with respect to the voltage applied to the part of the semiconductor light sources, and detects a fault in the part of the semiconductor light sources when the voltage applied to the part of the semiconductor light sources changes with respect to the voltage applied to all of the semiconductor light sources.

(Operation) The fault detection section detects a fault in any semiconductor light source other than the part of the semiconductor light sources when the voltage applied to all of the semiconductor light sources changes, for example relatively drops, with respect to a voltage applied to the part of the semiconductor light sources. The fault detection section detects a fault in the part of the semiconductor light sources when the voltage applied to the part of the semiconductor light sources changes, for example relatively drops, with respect to the voltage applied to all of the plurality of semiconductor light sources.

In accordance with one or more embodiments, a third aspect of the invention provides a lighting control circuit for a vehicle lighting fixture having: an energy supply control section which receives power from a power supply, and supplies light emission energy to a plurality of semiconductor light sources connected in series with each other as well as controls a current and a voltage for the plurality of semiconductor light sources; and a fault detection section which makes relative comparison between a voltage applied to all of the semiconductor light sources and a voltage applied to a part of the semiconductor light sources as well as makes relative comparison between the voltage applied to the part of the semiconductor light sources and a voltage applied to another part of the semiconductor light sources other than the part of the semiconductor light sources to detect a fault in any one of the semiconductor light sources.

(Operation) In a process where light emission energy is supplied to the plurality of semiconductor light sources connected in series with each other, relative comparison is made between the voltage applied to all of the semiconductor light sources and the voltage applied to the part of the semiconductor light sources as well as between the voltage applied to the part of the semiconductor light sources and the voltage applied to another part of the semiconductor light sources other than the part of the semiconductor light sources. The former relative comparison detects a fault in any semiconductor light sources other than the at least part of the semiconductor light sources while the latter relative comparison detects a fault in the part of the semiconductor light sources. As a result, it is possible to reliably detect a fault in any one of the plurality of semiconductor light sources without monitoring a voltage applied to each semiconductor light source, thereby simplifying the circuit configuration.

In accordance with one or more embodiments, a fourth aspect of the invention provides the lighting control circuit for the vehicle lighting fixture according to the third aspect, characterized in that the fault detection section detects a fault in any semiconductor light sources other than the part of the semiconductor light sources when the voltage applied to all of the semiconductor light sources changes with respect to the voltage applied to the part of the semiconductor light sources, and detects a fault in the part of the semiconductor light sources when the voltage applied to the part of the semiconductor light sources changes with respect to the voltage applied to another part of the semiconductor light sources other than the part of the semiconductor light sources.

(Operation) The fault detection section detects a fault in any semiconductor light source other than the part of the semiconductor light sources when the voltage applied to all of the semiconductor light sources changes, for example relatively drops, with respect to a voltage applied to the part of the semiconductor light sources. The fault detection section detects a fault in the part of the semiconductor light sources when the voltage applied to the part of the semiconductor light sources changes, for example relatively drops, with respect to the voltage applied to any semiconductor light source other than the part of the semiconductor light sources. By separately detecting a fault in the part of the semiconductor light sources and a fault in the other semiconductor light sources, it is possible to reliably detect a fault in any one of the plurality of semiconductor light sources.

In accordance with one or more embodiments, a fifth aspect of the invention provides a lighting control circuit for a vehicle lighting fixture having: an energy supply control section which receives power from a power supply, and supplies light emission energy to a plurality of semiconductor light sources connected in series with each other as well as controls a current and a voltage for the plurality of semiconductor light sources; and a fault detection section which makes relative comparison between a voltage applied to all of the semiconductor light sources and a voltage applied to a part of the semiconductor light sources as well as makes relative comparison between the voltage applied to the part of the semiconductor light sources and a set voltage to detect a fault in any one of the semiconductor light sources.

(Operation) In a process where light emission energy is supplied to the plurality of semiconductor light sources connected in series with each other, relative comparison is made between the voltage applied to all of the semiconductor light sources and the voltage applied to the part of the semiconductor light sources as well as between the voltage applied to the part of the semiconductor light sources and the set voltage. The former relative comparison detects a fault in any semiconductor light sources other than the part of the semiconductor light sources while the latter comparison (comparison between absolute values) detects a fault in the part of the semiconductor light sources. As a result, it is possible to reliably detect a fault in any one of the plurality of semiconductor light sources without monitoring a voltage applied to each semiconductor light source, thereby simplifying the circuit configuration.

In accordance with one or more embodiments, a sixth aspect of the invention provides the lighting control circuit for the vehicle lighting fixture according to the fifth aspect, characterized in that the fault detection section detects a fault in any semiconductor light source other than the part of the semiconductor light sources when the voltage applied to all of the semiconductor light sources changes with respect to the voltage applied to the part of the semiconductor light sources, and detects a fault in the part of the semiconductor light sources when the voltage applied to the part of the semiconductor light sources is out of the set voltage.

(Operation) The fault detection section detects a fault in any semiconductor light source other than the part of the semiconductor light sources when the voltage applied to all of the semiconductor light sources changes, for example relatively drops, with respect to a voltage applied to the part of the semiconductor light sources. The fault detection section detects a fault in the part of the semiconductor light sources when the voltage applied to the part of the semiconductor light sources is out of the set value, for example, exceeds the set voltage. It is thus possible to reliably detect a fault in any one of the plurality of semiconductor light sources.

As understood from the above description, according to the lighting control circuit for a vehicle lighting fixture of the first aspect, it is possible to detect a fault in any one of the semiconductor light sources other than the at least part of the semiconductor light sources without detecting a voltage applied to each semiconductor light source, thereby simplifying the circuit configuration.

According to the second aspect, it is possible to reliably detect a fault in any one of the plurality of semiconductor light sources.

According to the lighting control circuit for a vehicle lighting fixture of the third aspect, it is possible to detect a fault in any one of the plurality of semiconductor light sources without monitoring a voltage applied to each semiconductor light source, thereby simplifying the circuit configuration.

According to the fourth aspect, it is possible to reliably detect a fault in any one of the plurality of semiconductor light sources.

According to the lighting control circuit for a vehicle lighting fixture of the fifth aspect, it is possible to reliably detect a fault in any one of the plurality of semiconductor light sources without monitoring a voltage applied to each semiconductor light source, thereby simplifying the circuit configuration.

According to the sixth aspect, it is possible to more reliably detect a fault in any one of the plurality of semiconductor light sources.

One or more embodiments may include one or more of these aspects.

DETAILED DESCRIPTION OF THE PREFERRED EMBODIMENTS

Figure 1:
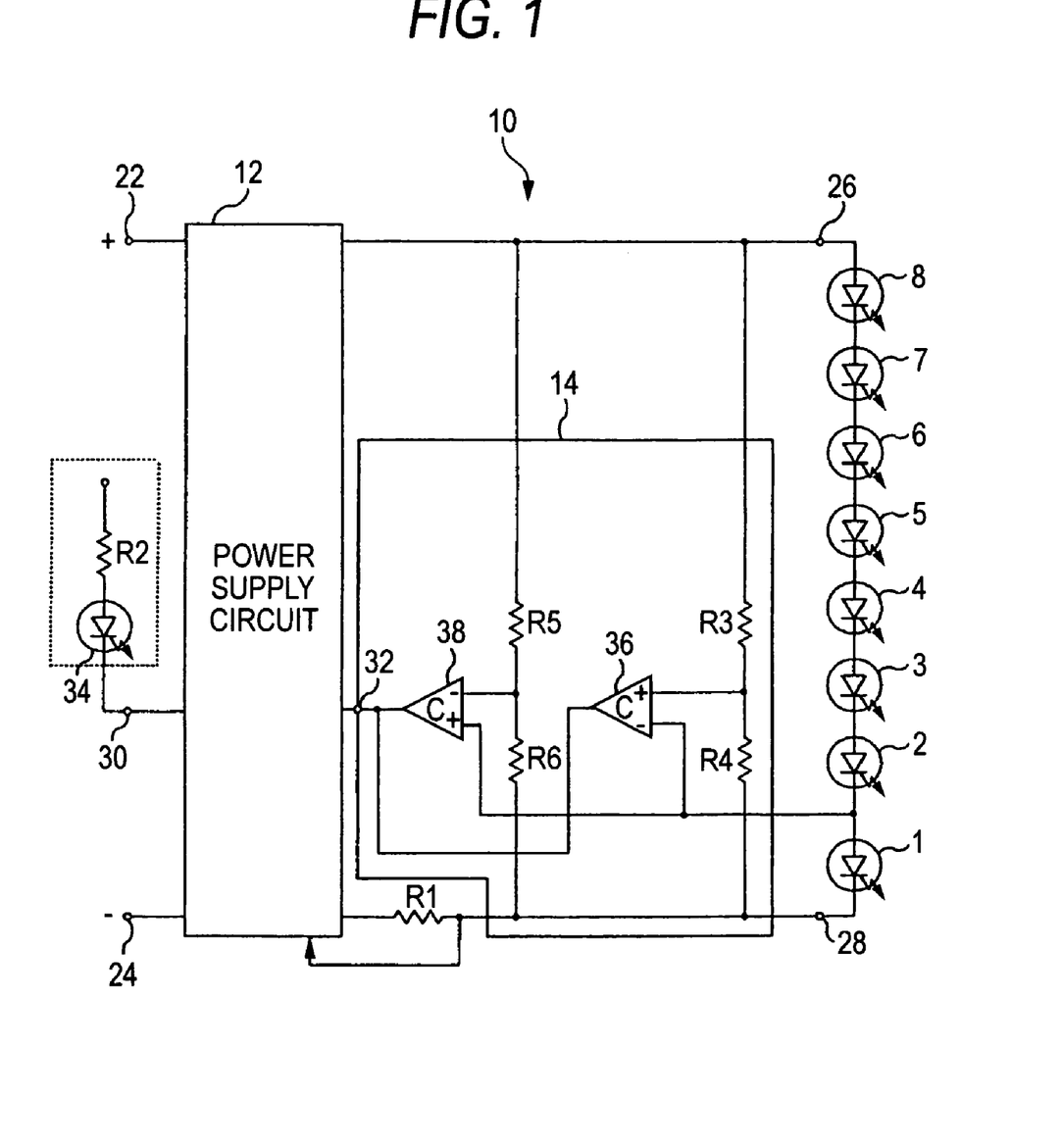
FIG. 1 is a block diagram of the lighting control circuit for a vehicle lighting fixture according to a first embodiment of the invention.
Figure 2:
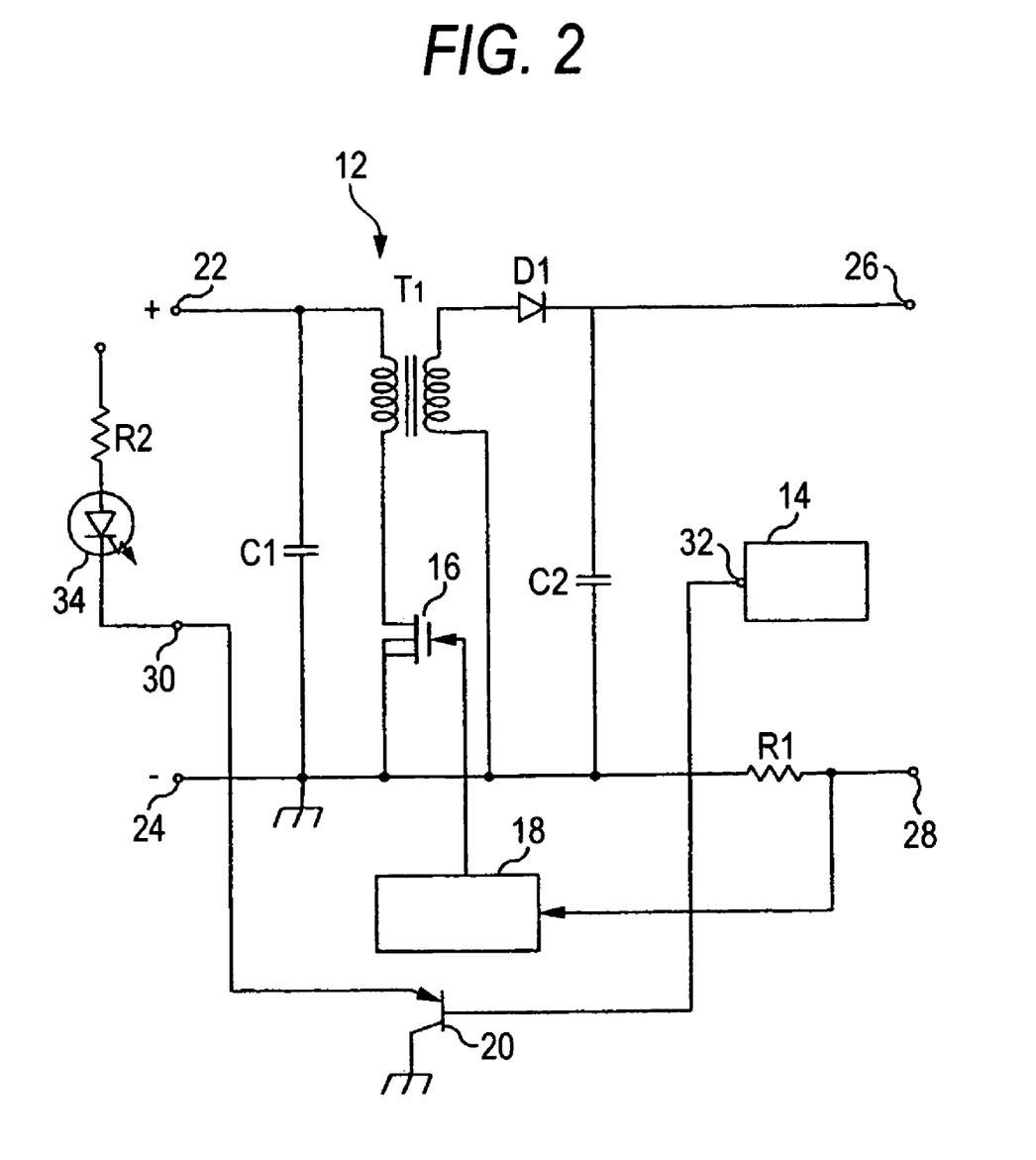
FIG. 2 is a circuit diagram of a power supply circuit.
Figure 3:
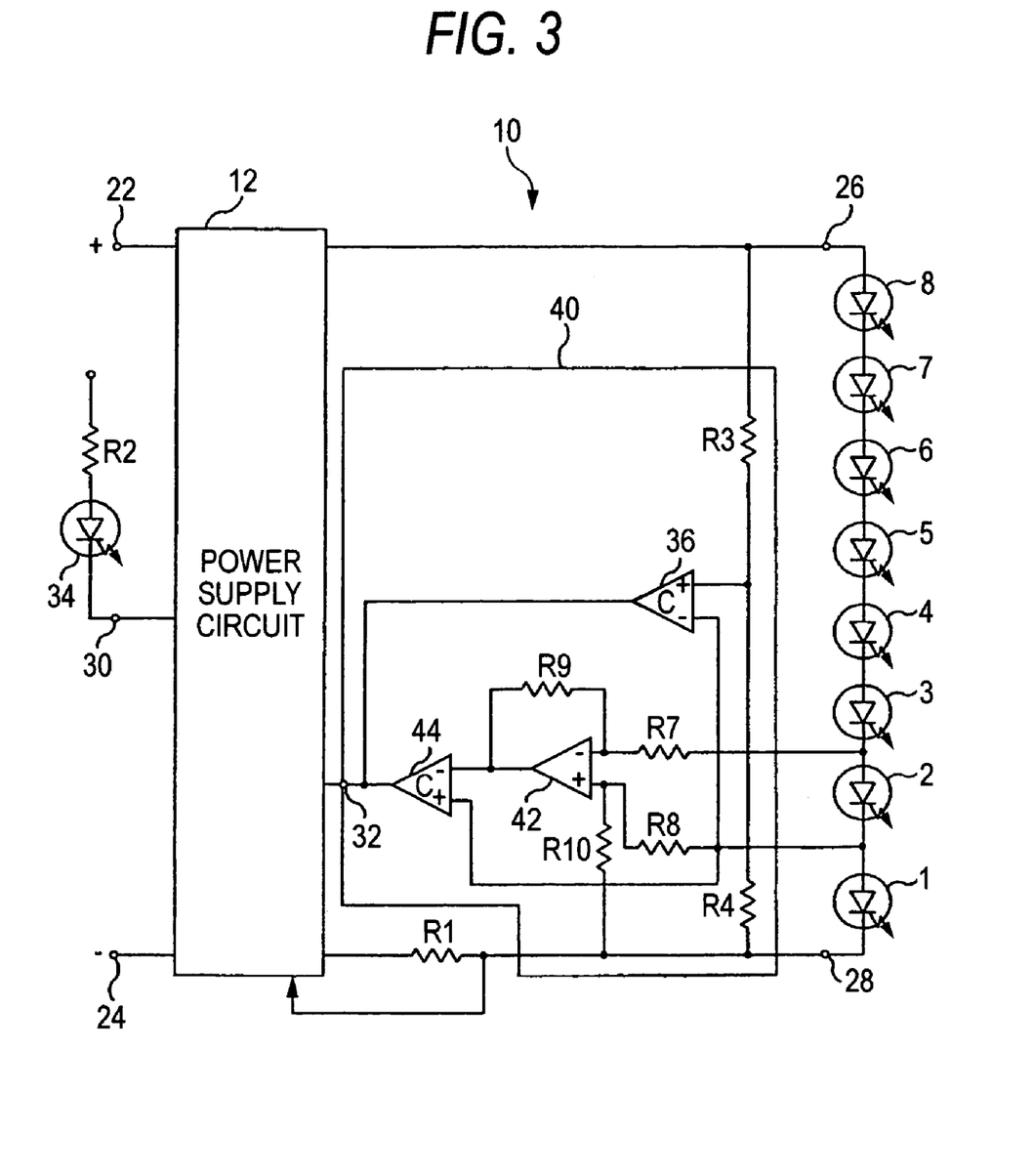
FIG. 3 is a block diagram of the lighting control circuit for a vehicle lighting fixture according to a second embodiment of the invention.
Figure 4:
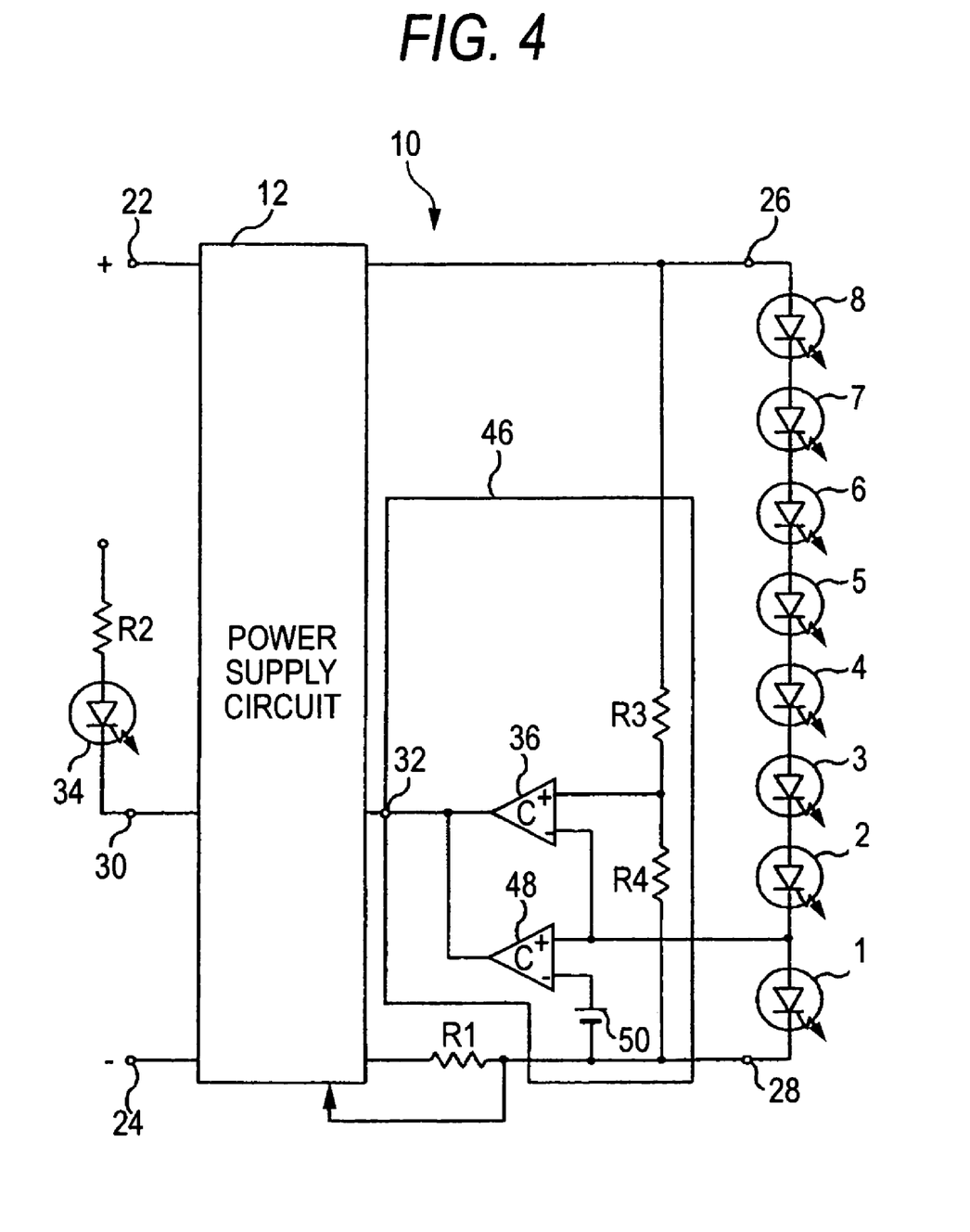
FIG. 4 is a block diagram of the lighting control circuit for a vehicle lighting fixture according to a third embodiment of the invention.
Figure 5:
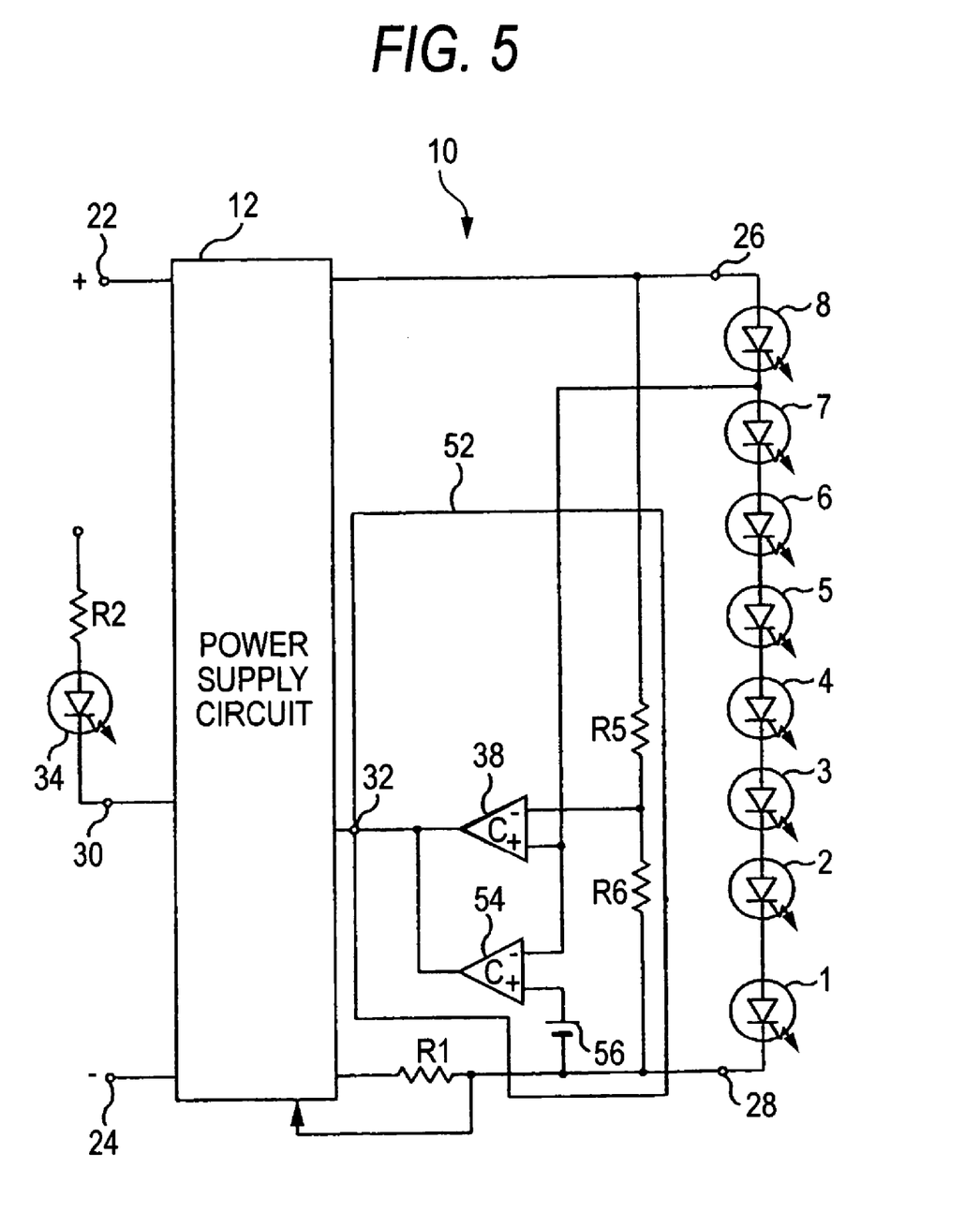
FIG. 5 is a block diagram of the lighting control circuit for a vehicle lighting fixture according to a fourth embodiment of the invention.

Embodiments of the invention will be described with reference to the figures. FIG. 1 is a block diagram of the lighting control circuit for a vehicle lighting fixture in a first embodiment of the invention. FIG. 2 is a circuit diagram of a power supply circuit. FIG. 3 is a block diagram of the lighting control circuit for a vehicle lighting fixture in a second embodiment of the invention. FIG. 4 is a block diagram of the lighting control circuit for a vehicle lighting fixture in a third embodiment of the invention. FIG. 5 is a block diagram of the lighting control circuit for a vehicle lighting fixture in a fourth embodiment of the invention.

As shown in FIG. 1, the lighting control circuit 10 for a vehicle lighting fixture has a power supply circuit 12 using as a load eight LEDs 1 through 8 serving as an element of the vehicle lighting fixture (light-emitting unit) and a fault detection circuit 14 for detecting a fault in the eight LEDs 1 through 8.

The LEDs 1 though 8 are connected in series with each other as a light source composed of a semiconductor light-emitting device. Both ends of the series of LEDs 1 through 8 are connected in parallel to the output of the power supply circuit 12. The LEDs 1 through 8 may be Zenor diodes as electrostatic protection devices connected in parallel, or capacitors or resistors connected in parallel instead of Zenor diodes. Alternatively, the LEDs 1 through 8 may be configured as a light source of various vehicle lighting fixtures such as a headlamp, stop and tail lamps, a fog lamp and a turn signal lamp.

As shown in FIG. 2, the power supply circuit 12 has a transformer T1, capacitors C1, C2, a diode D1 an NMOS transistor 16, a control circuit 16, and a fault detection PNP transistor 20. One end of the preliminary winding of the transformer T1 is connected to an input terminal 22 and the other end is connected to an input terminal 24 via the NMOS transistor 16. The input terminal 22 is connected to the plus terminal of the battery power supply and the input terminal 24 is connected to the negative terminal of the battery power supply and is grounded. One end of the secondary wiring of the transformer T1 is connected to an output terminal 26 via a diode D1 and the other end is connected to an output terminal 28 via a resistor R1. The upstream output terminal 26 is connected to the anode of an LED 8 and the downstream output terminal 28 is connected to the cathode of an LED 1. The gate of the NMOS transistor 16 is connected to a control circuit 18.

The control circuit 18 fetches a voltage across the resistor R1 in order to monitor the current flowing through the LEDs 1 to 8 and supplied a prespecified current, for example a rated current, to the LEDs 1 to 8 as well as generates a pulse signal to limit the voltage applied to the LEDs 1 to 8 within a certain range and outputs the generated pulse signal at the gate of the NMOS transistor 16. The NMOS transistor 16 is designed to perform switching operation in response to the pulse signal from the control circuit 18. When the NMOS transistor is turned on, electromagnetic energy is accumulated in the transformer T1. When the NMOS transistor is turned off, the electromagnetic energy accumulated on the primary side of the transformer T1 is emitted to the secondary side of the transformer T1. The electromagnetic energy emitted from the secondary side of the transformer T1 is supplied to the LEDs 1 to LEDs 8 as light-emission energy.

More specifically, the power supply circuit 12 is configured as energy supply control section for receiving DC power (power supply) from the battery and supplying light-emission energy (DC power) to the LEDs 1 through 8 as well as controlling a current and a voltage for the LEDs 1 through 8.

The fault detection PNP transistor 20 has an emitter connected to an external connection terminal 30, a grounded collector, and a base connected to the output terminal 32 of the fault detection circuit 14. The external connection terminal 30 is connected to an LED 34 via a lead wire. The LED 34 is connected to the positive terminal of the battery power supply via a resistor R2 and is installed in a car interior as an indicator lamp. The LED 34 illuminates when the PNP transistor 20 is turned on in response to a signal from the fault detection circuit 14 in order to report a fault in any one of the LEDs 1 through 8 to a driver.

As shown in FIG. 1, the fault detection circuit 14 has comparators 36, 38, resistors R3, R4, R5, R6 and makes relative comparison between a voltage applied to the whole (all) of the LEDs 1 through 8 and a voltage applied to part of the LEDs (LED 1) in order to detect a fault in any one of the LEDs 1 through 8.

The resistors R3 and R4 divides the voltage applied to the whole of the LEDs 1 through 8 and applies the obtained voltage to the positive input terminal of the comparator 36. To the negative input terminal of the comparator 36 is input a voltage applied across the most downstream LED 1. The open collector output of the comparator 36 is connected to the output terminal 32.

Assuming the resistance value of the resistor R3 as "7R", the resistance value of the resistor R4 is set to "R+α". Thus, a voltage slightly higher than that applied to the negative input terminal is input to the positive input terminal of the comparator 36. For example, in case the forward voltage Vf of the each of the LEDs 1 through 8 is the same, Vf is applied to the negative input terminal of the comparator 36 while a voltage slightly higher than that applied to the negative input terminal is applied to the positive input terminal of the comparator 36.

The comparator 36 makes relative comparison between a voltage applied to the whole of the LEDs 1 through 8 and a voltage applied across the LED 1. In case the voltage applied to the whole of the LEDs 1 through 8 is higher than the voltage applied across the LED 1, the comparator 36 assumes normal operation and outputs a High Level signal to the output terminal 32. When any one of the LEDs 2 through 8 has shorted and the voltage applied to the whole of the LEDs 1 through 8 has relatively changed, for example relatively dropped, with respect to the voltage applied across the most downstream LED 1 in the process of relative comparison between a voltage applied to the whole of the LEDs 1 through 8 and a voltage applied across the LED 1, the comparator 36 assumes an abnormality that accompanies a short-circuit fault in any one of the LEDs 2 through 8 and outputs a Low Level signal to the output terminal 32.

Resistors R5 and R6 divides the voltage applied to the whole of the LEDs 1 through 8 and applies the obtained voltage to the negative input terminal of the comparator 38. To the positive input terminal of the comparator 38 is input a voltage applied across the LED 1. The open collector output of the comparator 38 is connected to the output terminal 32.

Assuming the resistance value of the resistor R6 as "R", the resistance value of the resistor R5 is set to "7R+α". Thus, a voltage slightly higher than that applied to the positive input terminal is input to the negative input terminal of the comparator 38. For example, in case the forward voltage Vf of the each of the LEDs 1 through 8 is the same, Vf is applied as a voltage across the LED 1 to the positive input terminal of the comparator 38 while a voltage slightly lower than Vf is applied to the negative input terminal of the comparator 38.

In the case where the voltage applied to the positive input terminal is higher than the voltage applied to the negative input terminal, the comparator 38 assumes normal operation and outputs a High Level signal to the output terminal 32. When the most downstream LED 1 has shorted and the voltage applied across the most downstream LED 1 has relatively changed, more specifically, relatively dropped, with respect to the voltage applied to the whole of the LEDs 1 through 8 (voltage applied to the negative input terminal) in the process of relative comparison between a voltage applied to the whole of the LEDs 1 through 8 and a voltage applied across the LED 1, the comparator 38 assumes an abnormality that accompanies a short-circuit fault in the LEDs 1 and outputs a Low Level signal to the output terminal 32.

When the signal level at the output terminal 32 is inverted to a low level from a high level, the fault detection PNP transistor 20 is turned on and the LED 34 illuminates, which reports to a driver an abnormality that accompanies a short-circuit fault in any one of the LEDS 1 through 8.

According to this embodiment, an abnormality that accompanies a short-circuit fault in any one of the LEDs 2 through 8 is detected using the resistors R3, R4 and the comparator 36 and an abnormality that accompanies a short-circuit fault in the LED 1 is detected using the resistors R5, R6 and the comparator 38. It is thus possible to detect an abnormality that accompanies a short-circuit fault in any one of the LEDs 1 through 8 without providing each of the LEDs 1 through 8 with a fault detection circuit, thereby simplifying the circuit configuration.

According to this embodiment, even in case a single LED does not illuminate and light distribution is not satisfied, a driver may be notified of an abnormality via various types of warning such as by turning off all LEDs or turning on an indicator lamp.

While eight LEDs are used in this embodiment, five LEDs may be used instead. In such a case, the resistance value of the resistor R3 should be "4R", the resistance value of the resistor R4 "R+α", the resistance value of the resistor R5 "4R+α", and the resistance value of the resistor R6 "R". Or, tem LEDs may be used. In such a case, the resistance value of the resistor R3 should be "9R", the resistance value of the resistor R4 "R+α", the resistance value of the resistor R5 "9R+α", and the resistance value of the resistor R6 "R". When Vf values differ from each other as a characteristic of the LEDs 1 through 8, a divided-voltage resistance value may be regulated to support the situation.

Next, a second embodiment of the invention will be described in accordance with FIG. 3. This embodiment includes a fault detection circuit 40 in place of the fault detection circuit 14. The remaining configuration is the same as that shown in FIG. 1.

The fault detection circuit 40 makes relative comparison between a voltage applied to the whole of the LEDS 1 through 8 and part of the LEDs 1 through 8 (LED 1) as well as making relative comparison between a voltage applied the part of the LEDs 1 through 8 (LED 1) and a voltage applied to other part of the LEDs different from the part of the LEDS (LED 1) to detect a fault in any one of the LEDs 1 through 8 based on the result of the comparison.

In particular, the fault detection circuit 40 has resistors R3, R4 and a comparator 36 as well as resistors R7, R8, R9, R10 and a differential amplifier 42 and a comparator 44. The resistors R3 and R4 divides the voltage applied to the whole of the LEDs 1 through 8 and applies the obtained voltage to the positive input terminal of the comparator 36. To the negative input terminal of the comparator 36 is input a voltage applied across the most downstream LED 1. The open collector output of the comparator 36 is connected to the output terminal 32. Assuming the resistance value of the resistor R3 as "7R" as the resistance, the resistance value of the resistor R4 is set to "R+α". That is, the resistance values of the resistors R3 and R4 are set so that the voltage input to the positive input terminal of the comparator 36 will be slightly higher than the voltage applied to the negative input terminal of the comparator 36.

In the case where the voltage applied to the positive input terminal is higher than the voltage applied to the negative input terminal, the comparator 36 assumes normal operation and outputs a High Level signal to the output terminal 32. When any one of the LEDs 2 through 8 has shorted and the voltage applied to the whole of the LEDs 1 through 8 has relatively changed, for example relatively dropped, with respect to the voltage applied across the most downstream LED 1 in the process of relative comparison between a voltage applied to the whole of the LEDs 1 through 8 and a voltage applied across the LED 1, the comparator 36 assumes an abnormality that accompanies a short-circuit fault in any one of the LEDs 2 through 8 and outputs a Low Level signal to the output terminal 32.

The differential amplifier 42 amplifies a voltage across the LED 2 and outputs the amplified voltage to the negative input terminal of the comparator 44. In this case, a voltage across the LED 1 is applied to the positive input terminal of the comparator 44. Thus, the resistance values of resistors R7 through R10 are set so that a voltage slightly lower than the voltage applied to the positive terminal will be applied to the negative terminal of the comparator 44. For example, assuming the resistance values of the resistor R9 and the resistor R10 are set to "R" respectively, the resistance value of the resistors R7 and R8 are set to "R+α". The comparator 44 makes relative comparison between a voltage applied across the LED 2 as a voltage applied to part of the LEDs and a voltage obtained by amplifying a voltage across the LED 2 as other part of the LEDs different from the part of the LEDs and assumes normal operation and outputs a High Level signal to the output terminal 32 when both voltages do not relatively change. When the LED 1 has shorted and the voltage applied to the positive input terminal has relatively changed, for example relatively dropped, with respect to the voltage applied to the negative input terminal in the process of relative comparison between a voltage applied to the positive input terminal and a voltage applied to the negative input terminal, the comparator 36 assumes a fault and outputs a Low Level signal to the output terminal 32.

When the signal level at the output terminal 32 is inverted to a low level from a high level, the fault detection PNP transistor 20 is turned on and the LED 34 illuminates, which reports to a driver a fault in any one of the LEDS 1 through 8.

According to this embodiment, an abnormality that accompanies a short-circuit fault in any one of the LEDs 2 through 8 is detected using the resistors R3, R4 and the comparator 36 and an abnormality that accompanies a short-circuit fault in the LED 1 is detected using the resistors R7 through R10, the differential amplifier and the comparator 44. It is thus possible to detect an abnormality that accompanies a short-circuit fault in any one of the LEDs 1 through 8 without providing each of the LEDs 1 through 8 with a fault detection circuit, thereby simplifying the circuit configuration.

Next, a third embodiment of the invention will be described in accordance with FIG. 4. This embodiment includes a fault detection circuit 46 in place of the fault detection circuit 14. The remaining configuration is the same as that shown in FIG. 1.

The fault detection circuit 46 makes relative comparison between a voltage applied to the whole of the LEDs 1 through 8 and a voltage applied to part of the LEDs (LED 1) as well as making relative comparison between a voltage applied to part of the LEDs (LED 1) and a set voltage (comparison between absolute values) to detect a fault in any one of the LEDs 1 through 8 based on the result of the comparison.

In particular, the fault detection circuit 46 has resistors R3, R4 and comparators 36, 37 and a power supply 50.

The resistors R3 and R4 are set to the same resistance values as those in FIG. 1. The comparator 36 makes relative comparison between a voltage applied to the whole of the LEDs 1 through 8 and a voltage applied across the LED 1 and assumes normal operation and outputs a High Level signal to the output terminal 32 when the voltage applied to the positive input terminal is higher than the voltage applied to the negative input terminal. When any one of the LEDs 2 through 8 has shorted and the voltage applied to the whole of the LEDS 1 through 8 has relatively changed, for example relatively dropped, with respect to the voltage applied to the LED 1 in the process of relative comparison between a voltage applied to the positive input terminal and a voltage applied to the negative input terminal, the comparator 36 assumes an abnormality that accompanies a short-circuit fault in any one of the LEDs 1 through 8 and outputs a Low Level signal to the output terminal 32.

The comparator 48 has a positive input terminal connected to the anode of the LED 1 and has a negative input terminal connected to the plus terminal of the power supply 50. The comparator 48 makes relative comparison between a voltage applied across the LED 1 and a set voltage set by the power supply 50 (comparison between absolute values) and outputs a High Level or Low Level signal to the output terminal 32. In this case, the set voltage set by the power supply 50 is slightly lower than the voltage applied across the LED 1. Thus, the comparator 48 outputs a High Level signal to the output terminal 32 when the LED 1 is in normal state. The comparator 48 assumes an abnormality that accompanies a short-circuit fault in the LED 1 and outputs a Low Level signal to the output terminal 32 when the LED 1 has shorted.

When the signal level at the output terminal 32 is inverted to a low level from a high level, the fault detection PNP transistor 20 is turned on and the LED 34 illuminates, which reports to a driver an abnormality that accompanies a short-circuit fault in any one of the LEDS 1 through 8.

According to this embodiment, an abnormality that accompanies a short-circuit fault in any one of the LEDs 2 through 8 is detected using the resistors R3, R4 and the comparator 36 and an abnormality that accompanies a short-circuit fault in the LED 1 is detected using the comparator 48 and the power supply 50. It is thus possible to detect an abnormality that accompanies a short-circuit fault in any one of the LEDs 1 through 8 without providing each of the LEDs 1 through 8 with a fault detection circuit, thereby simplifying the circuit configuration.

Next, a fourth embodiment of the invention will be described in accordance with FIG. 5. This embodiment includes a fault detection circuit 52 in place of the fault detection circuit 14 and uses the most upstream LED 8 as a target of fault detection in place of the LED 1. The remaining configuration is the same as that shown in FIG. 1.

The fault detection circuit 52 makes relative comparison between a voltage applied to the whole of the LEDs 1 through 8 and a voltage applied to part of the LEDs (LED 8) as well as making relative comparison between a voltage applied to part of the LEDs (LED 8) and a set voltage (comparison between absolute values) to detect a fault in any one of the LEDs 1 through 8 based on the result of the comparison.

In particular, the fault detection circuit 52 has resistors R5, R6, comparators 38, 54 and a power supply 50.

The resistors R5 and R6 are set to the same resistance values as those in FIG. 1. A voltage divided by the resistors R5, R6 is applied to the negative input terminal of the comparator 38. To the positive input terminal of the comparator 38 is input a voltage applied to the cathode of the LED 8. In this case, a voltage slightly lower than the voltage applied to the positive input terminal is applied to the negative input terminal of the comparator 38. That is, the comparator 38 makes relative comparison between a voltage applied to the positive input terminal and a voltage applied to the negative input terminal. When the voltage applied to the positive input terminal is higher than the voltage applied to the negative input terminal, the comparator 38 assumes normal operation and outputs a High Level signal to the output terminal 32. When any one of the LEDs 1 through 7 has shorted and the voltage applied to the whole of the LEDS 1 through 8 has relatively changed, for example relatively dropped, with respect to the voltage applied to the LED 8 in the process of relative comparison between a voltage applied to the whole of the LEDs 1 through 8 and a voltage applied to the LED 8, the comparator 38 assumes an abnormality that accompanies a short-circuit fault in any one of the LEDs 1 through 7 and outputs a Low Level signal to the output terminal 32.

The comparator 54 has a negative input terminal connected to the cathode of the LED 8 and has a positive input terminal connected to the plus terminal of the power supply 56. The set voltage set by the power supply 56 is slightly higher than the voltage applied to the negative input terminal of the comparator 54. The comparator 54 makes relative comparison between a voltage applied to the positive input terminal and a voltage applied to the negative input terminal (comparison between absolute values). When the set voltage is higher than the voltage applied to the negative input terminal, the comparator 54 assumes normal operation and outputs a High Level signal to the output terminal 32. When the LED 8 has shorted and the voltage applied to the negative input terminal is higher than the set voltage, the comparator 54 assumes an abnormality that accompanies a short-circuit fault in the LEDs 8 and outputs a High Level signal to the output terminal 32.

When the signal level at the output terminal 32 is inverted to a low level from a high level, the fault detection PNP transistor 20 is turned on and the LED 34 illuminates, which reports to a driver an abnormality that accompanies a short-circuit fault in any one of the LEDS 1 through 8.

According to this embodiment, an abnormality that accompanies a short-circuit fault in any one of the LEDs 1 through 7 is detected using the resistors R5, R6 and the comparator 38 and an abnormality that accompanies a short-circuit fault in the LED 8 is detected using the comparator 54 and the power supply 56. It is thus possible to detect an abnormality that accompanies a short-circuit fault in any one of the LEDs 1 through 8 without providing each of the LEDs 1 through 8 with a fault detection circuit, thereby simplifying the circuit configuration.

While the LEDs 1 through 8 are arranged in a row and connected in series in the foregoing embodiments, multiple rows each including a plurality of LEDs connected in series may be provided. In this case, by providing each row with any one of the fault detection circuits 14, 40, 46 and 52 and by providing wired OR connection of the output of the fault detection circuit of each row to the output terminal 32, it is possible to notify a driver of an abnormality that accompanies a short-circuit fault in an LED that belongs to any one of the rows.

When considering variations in Vf of the LEDs 1 through 8 between the embodiments, the same current flows in the LEDs 1 through 8 concerning the "VI characteristic of LED". Thus, when Vf of a single LED is monitored without the other LEDs being monitored, Vf of the other LEDs may be treated as being relatively the same as Vf of the target of monitoring. It is possible to reliably detect a fault without considering variations in Vf caused by the VI characteristic of the LEDs 1 through 8.

For the "temperature characteristic of LED", all LEDs 1 through 8 are housing in the same lamp and reach the same temperature, Thus, when Vf of a single LED is monitored without the other LEDs being monitored, Vf of the other LEDs may be treated as being relatively the same as Vf of the target of monitoring. It is possible to reliably detect a fault without considering variations in Vf caused by the temperature characteristic of the LEDs.

For "individual difference between LEDs", it is possible to more accurately detect a fault using the LEDs 1 through 8 belonging to the same Vf level.

While the embodiments describe an abnormality that accompanies any one the LEDs 1 through 8, when for example a Zenor diodes are connected as electrostatic protection devices in parallel to the LEDs 1 through 8, a wire break in any one of the LEDs 1 through 8 causes a drop in the voltage across an LED in which the wire break has taken place. It is thus possible to detect an abnormality that accompanies a wire break in any one of the LEDs 1 through 8 based on a drop in the voltage.

What is claimed is:

1. A lighting control circuit for a vehicle lighting fixture, comprising:
   an energy supply control section which receives power from a power supply, and supplies light emission energy to a plurality of semiconductor light sources connected in series with each other as well as controls a current and a voltage for the plurality of semiconductor light sources; and
   a fault detection section which makes relative comparison between a voltage applied to all of the semiconductor light sources and a voltage applied to a part of the semiconductor light sources to detect a fault in any one of the semiconductor light sources.

2. The lighting control circuit for the vehicle lighting fixture according to claim 1,
   wherein the fault detection section detects a fault in any semiconductor light source other than the part of the semiconductor light sources when the voltage applied to all of the semiconductor light sources changes with respect to the voltage applied to the part of the semiconductor light sources, and detects a fault in the part of the semiconductor light sources when the voltage applied to the part of the semiconductor light sources changes with respect to the voltage applied to all of the semiconductor light sources.

3. A lighting control circuit for a vehicle lighting fixture, comprising:

an energy supply control section which receives power from a power supply, and supplies light emission energy to a plurality of semiconductor light sources connected in series with each other as well as controls a current and a voltage for the plurality of semiconductor light sources; and a fault detection section which makes relative comparison between a voltage applied to all of the semiconductor light sources and a voltage applied to a part of the semiconductor light sources as well as makes relative comparison between the voltage applied to the part of the semiconductor light sources and a voltage applied to another part of the semiconductor light sources other than the part of the semiconductor light sources to detect a fault in any one of the semiconductor light sources.

4. The lighting control circuit for the vehicle lighting fixture according to claim 3, wherein the fault detection section detects a fault in any semiconductor light source other than the part of the semiconductor light sources when the voltage applied to all of the semiconductor light sources changes with respect to the voltage applied to the part of the semiconductor light sources, and detects a fault in the part of the semiconductor light sources when the voltage applied to the part of the semiconductor light sources changes with respect to the voltage applied to another part of the semiconductor light sources other than the part of the semiconductor light sources.

5. A lighting control circuit for a vehicle lighting fixture, comprising:

an energy supply control section which receives power from a power supply, and supplies light emission energy to a plurality of semiconductor light sources connected in series with each other as well as controls a current and a voltage for the plurality of semiconductor light sources; and a fault detection section which makes relative comparison between a voltage applied to all of the semiconductor light sources and a voltage applied to a part of the semiconductor light sources as well as makes relative comparison between the voltage applied to the part of the semiconductor light sources and a set voltage to detect a fault in any one of the semiconductor light sources.

6. The lighting control circuit for a vehicle lighting fixture according to claim 5, wherein the fault detection section detects a fault in any semiconductor light source other than the part of the semiconductor light sources when the voltage applied to all of the semiconductor light sources changes with respect to the voltage applied to the part of the semiconductor light sources, and detects a fault in the part of the semiconductor light sources when the voltage applied to the part of the semiconductor light sources is out of the set voltage.

7. The lighting control circuit for the vehicle lighting fixture according to claim 1, wherein the part of the semiconductor light sources is the most downstream semiconductor light source or the most upstream semiconductor light source out of the plurality of semiconductor light sources connected in series.

8. The lighting control circuit for the vehicle lighting fixture according to claim 3, wherein the part of the semiconductor light sources is the most downstream semiconductor light source or the most upstream semiconductor light source out of the plurality of semiconductor light sources connected in series.

9. The lighting control circuit for the vehicle lighting fixture according to claim 5, wherein the part of the semiconductor light sources is the most downstream semiconductor light source or the most upstream semiconductor light source out of the plurality of semiconductor light sources connected in series.

* * * * *